INVENTOR
STANFORD BRUCE SPRACKLEN
BY HIS ATTORNEYS
HARRIS, KIECH, RUSSELL & KERN

3,028,470
OVEN TEMPERATURE CONTROL
Stanford Bruce Spracklen, Fullerton, Calif., assignor to Beckman Instruments, Inc., a corporation of California
Filed Feb. 12, 1960, Ser. No. 8,438
1 Claim. (Cl. 219—19)

This invention relates to ovens and the like in which the temperature of the interior is automatically maintained at a predetermined value.

It is an object of the invention to provide an oven for receiving an instrument component with the temperature within the oven being automatically controlled within very close tolerances. A further object is to provide such an instrument which is simple and inexpensive and which requires no moving parts or electrical control circuitry.

It is an object of the invention to provide an automatically temperature controlled oven which can be manufactured in a very small package and one that is particularly adapted to receive plug-in components which may be inserted and removed at will.

It is an object of the invention to provide an oven for maintaining a component at a substantially constant temperature, the oven having a thermally insulated housing enclosing an oven space for receiving the component, a closed container of liquid within the oven space, means for heating the liquid to a boiling point to vaporize a portion of the liquid, a condenser positioned externally of the housing, and means connecting the closed container to the condenser for vapor flow from the container to the condenser and liquid flow from the condenser to the container.

The invention also comprises novel details of construction and novel combinations and arrangements of parts, which will more fully appear in the course of the following description. The drawing merely shows and the description merely describes a preferred embodiment of the present invention which is given by way of illustration or example.

Figure 1:
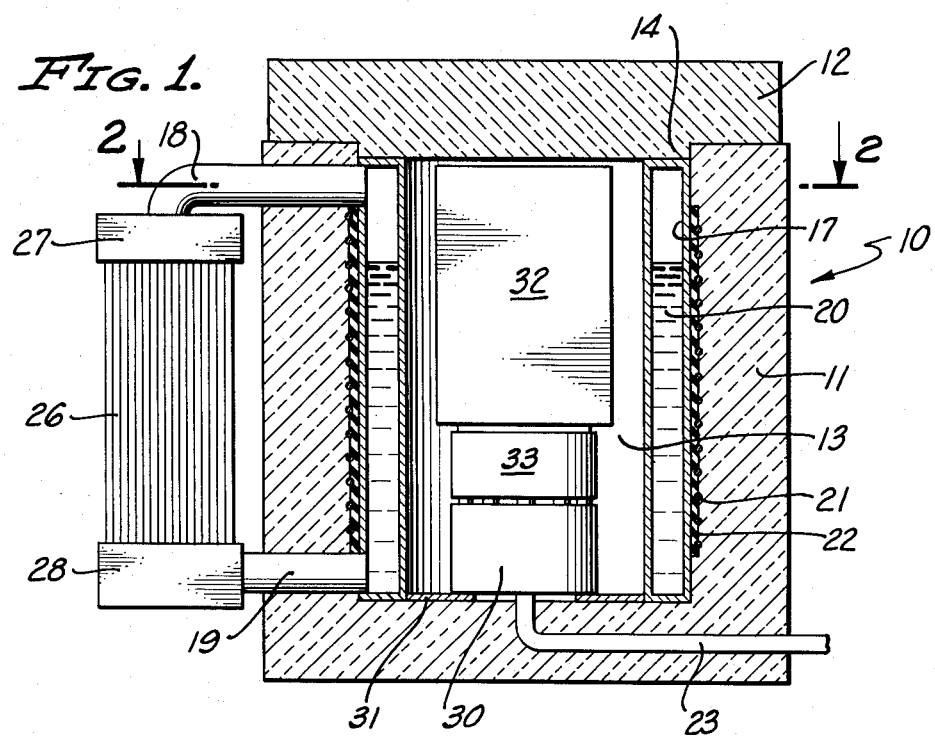
FIG. 1 is a sectional view of a preferred form of the oven.
Figure 2:
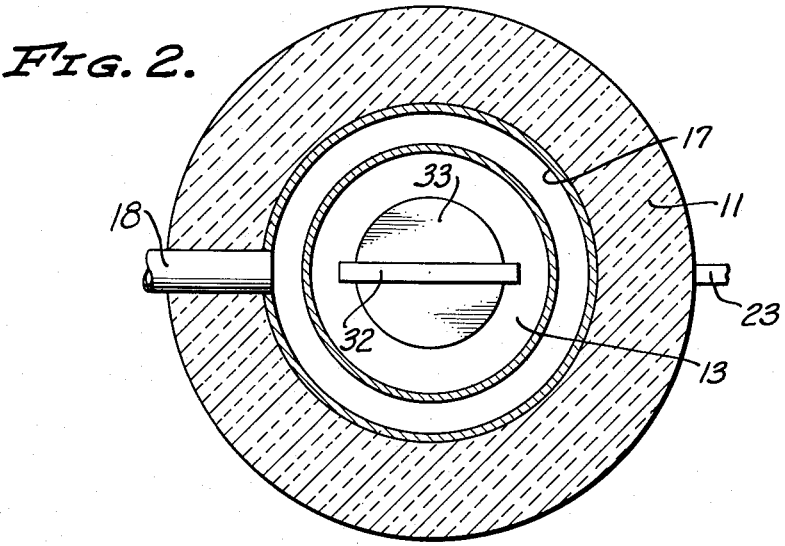
FIG. 2 is a sectional view taken along the line 2—2 of FIG. 1.

A housing 10 formed of a body 11 and cover 12 encloses an oven space 13. The body and cover are formed of thermal insulating material such as cork, melamine or styrafoam, the cover 12 preferably having a projecting section 14 which fits into the body 11. A container 17 is positioned within the oven space 13, the container preferably being annular in shape and disposed about the periphery of the oven space. The container 17 is closed except for conduits 18, 19 and is partially filled with a liquid 20.

Means are provided for heating the liquid in the container and, in the preferred form shown herein, a length of electrical resistance heating wire 21 is wound around the container 17, the wire being separated from the container by a layer of electrical insulating material 22. The heating wire 21 is connected to an external power source through a cable 23.

A condenser 26 has a vapor inlet 27 connected to the conduit 18 and a liquid outlet 28 connected to the conduit 19, the condenser being positioned externally of the housing 10 and preferably supported by the conduits.

Any component the temperature of which is to be maintained substantially constant may be positioned within the oven space 13. Typical examples of components are oscillator circuits, crystals, vacuum tubes, gas flow detectors, and the like. Appropriate electrical cables and fluid conduits may be passed through the housing for operation of the component within the oven space. In the particular embodiment shown herein, an electrical socket 30 is mounted on a plate 31 in the body 11 with the socket connected to external circuitry through the cable 23. A plug-in component in the form of a printed circuit board 32 having a plug 33 is inserted in the socket 30.

In the operation of the oven, the liquid 20 is heated to the boiling point so as to vaporize a portion of the liquid. The vapor from the liquid passes out through the conduit 18 to the condenser where it is condensed to a liquid and returned to the container through the conduit 19. The vapor-liquid system comprising the container and the condenser is closed and, hence, operates at a constant pressure. Since the pressure in the system is constant, the temperature of the liquid within the container will also be constant at its boiling point. Once the liquid has been heated to the boiling point, the temperature within the housing will be maintained constant at this point.

The heat source is operated at a constant rate, i.e., a fixed voltage is connected across the resistance heating wire, and no control circuit or temperature sensing element is required. This device provides very close control of temperature without requiring any moving parts or any external control circuitry.

For example, in an oven in which the oven space was about three-quarters of an inch diameter and two and one-half inches high, acetone having a boiling point of 56.2° C. was used as the liquid in the container and provided a controlled temperature in the oven within plus or minus 0.1° C. from the boiling point of the liquid. The oven can be used to maintain a component at almost any desired temperature, it merely being necessary to find a material that boils at the particular temperature of interest. The operation of the oven is substantially independent of the temperature of the surrounding atmosphere, the only requirement being that the temperature differential between the interior of the oven and the surrounding atmosphere be sufficient to provide adequate condensing action in the condenser.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

In an oven for maintaining a component at a substantially constant temperature, the combination of: a thermally insulated housing enclosing a cylindrical oven space, said housing including a removable section at one end thereof; an annular container of liquid disposed about the edge of said cylindrical space; an electrical resistance heater wound around said container for heating said liquid to its boiling point to vaporize a portion of the liquid; a socket carried in said space adjacent the other end of said housing for receiving a plug-in component; a cable passing through said housing for connecting said heater and said socket to external circuitry; a condenser positioned externally of said housing and having a vapor inlet and a liquid outlet; a first conduit passing through said housing for connecting said condenser inlet to said container adjacent said one end for vapor flow from said container to said condenser; and a second conduit passing through said housing for connecting said condenser outlet to said container adjacent said other end for liquid flow from said condenser to said container, with said container, condenser, and first and second conduits providing a closed fluid flow path for continuous recirculation therethrough.

(References on following page)

References Cited in the file of this patent

UNITED STATES PATENTS

| | | |
|---|---|---|
| 1,700,839 | Gay | Feb. 5, 1929 |
| 1,753,676 | Whitney | Apr. 8, 1930 |
| 1,904,140 | Hentschel | Apr. 18, 1933 |
| 2,453,433 | Hansen et al. | Nov. 9, 1948 |
| 2,665,566 | Grimshaw | Jan. 12, 1954 |
| 2,676,274 | Kobayashi | Apr. 20, 1954 |
| 2,875,263 | Narbut | Feb. 24, 1959 |